UNITED STATES PATENT OFFICE.

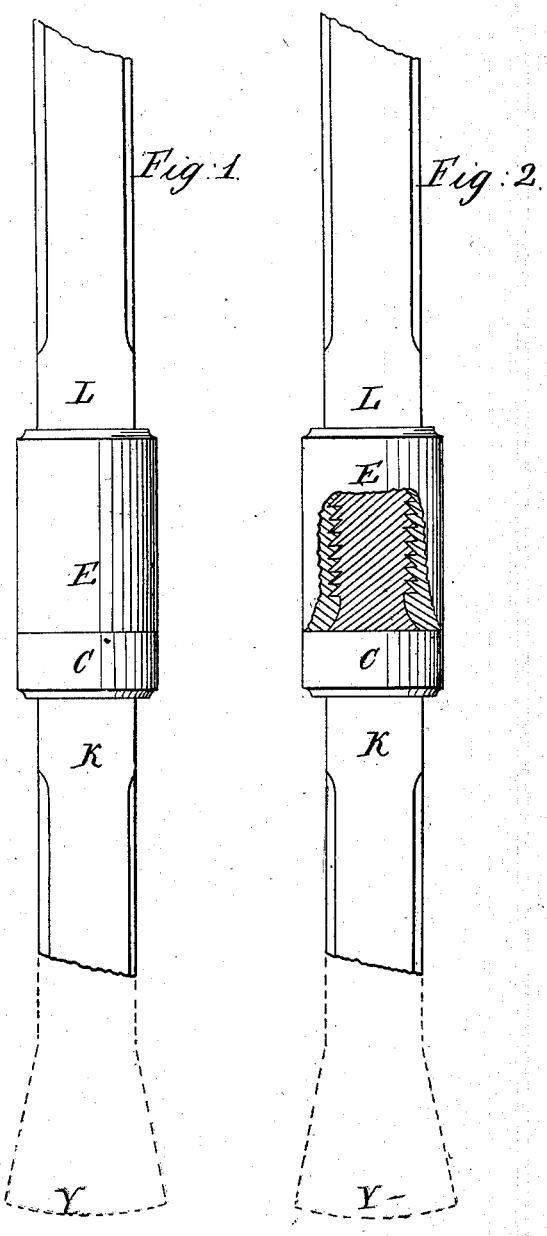

ROBERT H. LECKY, OF ALLEGHENY CITY, PENNSYLVANIA.

COUPLING SHAFTS OF BORING-TOOLS.

Specification forming part of Letters Patent No. 47,555, dated May 2, 1865.

*To all whom it may concern:*

Be it known that I, ROBERT H. LECKY, of Allegheny City, in the county of Allegheny and State of Pennsylvania, have invented certain new and useful Improvements in Socket-Joints for Oil-Tools, &c.; and I do hereby declare that the following is a full and exact description thereof, reference being had to the accompanying drawings, and to the letters of reference marked thereon.

The nature of my invention consists in the combination of the angular and square threads on the screw or male part of socket-joints of oil-tools, and also the same combination of threads in the nut or female part of the socket-joints, the whole being constructed and arranged as herein described.

To enable others skilled in the art of making socket-joints to make and use my invention, I will proceed to describe its construction and operation.

In the accompanying drawings, Figure 1 represents a side view of my improved socket-joint. Fig. 2 represents a sectional view of the same.

I construct my improved socket-joint in any of the known forms; but instead of using the square or angular screw-threads in the nut or female and screw or male part of the socket-joint I combine the square and angular threads in each of them.

In the drawings, L and K represent the squares used for holding the parts and for wrenching them together. E represents the female part of the joint. C represents the male part of the joint. Y represents in dotted lines the drill.

In constructing my improved screw-threads I combine the square and angular screw-threads by making the bearing or drawing side of the threads of screws flat and at right angles with the plane of the nut and screw of the male and female part of the socket-joint.

The form of my improved and combined screw-threads will be readily seen and understood by reference to Fig. 2, in the accompanying drawings.

It will be observed that the bearing or drawing side of the threads can be (if desired) made slightly concave.

The advantages of combining the square and angular screw-threads together so as to form one thread, is as follows: I have all the advantage of the angular thread with all the steadiness gained by the square thread combined in one thread, and I also overcome the liability of the socket to spread out from the screw of the male part.

Having thus described the nature, construction, and operation of my improvement, what I claim as of my invention is—

Constructing the screw-threads of socket-joints for oil-tools, &c., in the manner substantially herein described, and for the purpose set forth.

R. H. LECKY.

Witnesses:
   JAMES J. JOHNSTON,
   ALEXANDER HAYS.